United States Patent
Wu

(10) Patent No.: US 9,723,609 B2
(45) Date of Patent: Aug. 1, 2017

(54) METHOD, BASE STATION AND USER EQUIPMENT OF EXTENDING TRANSMISSION COVERAGE

(71) Applicant: HTC Corporation, Taoyuan County (TW)

(72) Inventor: Chih-Yao Wu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 354 days.

(21) Appl. No.: 14/512,482

(22) Filed: Oct. 13, 2014

(65) Prior Publication Data

US 2015/0103781 A1 Apr. 16, 2015

Related U.S. Application Data

(60) Provisional application No. 61/889,536, filed on Oct. 11, 2013.

(51) Int. Cl.
*G01R 31/08* (2006.01)
*H04L 5/14* (2006.01)
(Continued)

(52) U.S. Cl.
CPC ....... *H04W 72/0446* (2013.01); *H04W 4/005* (2013.01); *H04W 8/005* (2013.01); *H04W 4/023* (2013.01)

(58) Field of Classification Search
CPC . H04W 72/0446; H04W 4/005; H04W 8/005; H04W 4/023
See application file for complete search history.

(56) References Cited

U.S. PATENT DOCUMENTS

2013/0203450 A1   8/2013   Mochizuki et al.
2013/0301434 A1*  11/2013  Krishnamurthy ..... H04L 1/0026
                                                      370/252
(Continued)

FOREIGN PATENT DOCUMENTS

EP           2835990         2/2015

OTHER PUBLICATIONS

3GPP Organizational Partners, "3rd Generation Partnership Project; Technical Specification Group Radio Access Network; Evolved Universal Terrestrial Radio Access (E-UTRA); Physical Channels and Modulation (Release 11)," 3GPP TS 36.211 V11.2.0, Feb. 2013, pp. 1-109.

(Continued)

*Primary Examiner* — Faruk Hamza
*Assistant Examiner* — Abu-Sayeed Haque
(74) *Attorney, Agent, or Firm* — Jianq Chyun IP Office

(57) ABSTRACT

The present disclosure is directed to a method of extending cell coverage, a base station using the same method, and a user equipment using the same method. In one of the exemplary embodiments, a base station transmits a system information over a physical channel located at a first physical location in a group of radio frames to a user equipment (UE). The base station would then determine based on at least a cell identification (ID) of the base station the second physical location for a repetition of the system information over the physical channel located at the second physical location in a group of radio frames. The base station would then transmit the repetition of the system information at the second physical location in the group of radio frames to the UE.

20 Claims, 9 Drawing Sheets

(51) Int. Cl.
  *H04B 7/00* (2006.01)
  *H04J 3/00* (2006.01)
  *H04W 72/04* (2009.01)
  *H04W 8/00* (2009.01)
  *H04W 4/00* (2009.01)
  *H04W 4/02* (2009.01)

(56) References Cited

U.S. PATENT DOCUMENTS

| | | | | |
|---|---|---|---|---|
| 2013/0344909 | A1* | 12/2013 | Davydov | H04B 7/0689 455/501 |
| 2014/0204809 | A1* | 7/2014 | Kim | H04J 13/0062 370/280 |
| 2015/0131750 | A1* | 5/2015 | Xue | H04B 7/0482 375/267 |
| 2015/0201368 | A1* | 7/2015 | Cudak | H04W 48/12 370/329 |
| 2015/0351116 | A1* | 12/2015 | Shoshan | H04B 7/15542 370/330 |

OTHER PUBLICATIONS

3GPP Organizational Partners, "3rd Generation Partnership Project; Technical Specification Group Radio Access Network; Evolved Universal Terrestrial Radio Access (E-UTRA); Multiplexing and channel coding (Release 11)," 3GPP TS 36.212 V11.2.0, Feb. 2013, pp. 1-82.

Alcatel-Lucent et al., "Coverage enhancement techniques for PBCH" 3GPP TSG-RAN WG1 Meeting #74bis, Oct. 2013, pp. 1-6.

Ericsson et al., "Coverage enhancements for MTC—system information," 3GPP TSG-RAN WG1 Meeting #72bis, Apr. 2013, pp. 1-8.

Alcatel-Lucent et al., "Coverage enhancement for PBCH," 3GPP TSG-RAN WG1 Meeting #74, Aug. 2013, pp. 1-3.

"Office Action of European Counterpart Application", issued on Feb. 25, 2015, p. 1-p. 5.

\* cited by examiner

METHOD, BASE STATION AND USER EQUIPMENT OF EXTENDING TRANSMISSION COVERAGE

CROSS REFERENCE TO RELATED APPLICATION

This application claims the priority benefit of U.S. provisional application Ser. No. 61/889,536, filed on Oct. 11, 2013. The entirety of the above-mentioned patent application is hereby incorporated by reference herein and made a part of specification.

TECHNICAL FIELD

The present disclosure is directed to a method of extending transmission coverage, a base station using the same method, and a user equipment (UE) using the same method.

BACKGROUND

Long Term Evolution Advanced (LTE-A) is a wireless communication standard developed by 3$^{rd}$ Generation Partnership Project (3GPP). Recently, low cost machine type communication (MTC) UEs has been under discussions in 3GPP meetings to consider various potential deployment scenarios for the LTE-A wireless communication systems. As the trend of future wireless technology may gravitate toward pervasive wireless nodes such as smart meters, household appliances in work networks, smart health caring devices, smart security devices, and so forth, ways to extend current technology to accommodate MTC devices have been under discussions.

Future MTC devices could be regarded to be low cost, small, and pervasive. Some of them may even possibly be located in deep indoor environment such as in a basement that could be many floors deep. The transmission and reception abilities of such MTC devices could be assumed to be quite limited as having limited bandwidth usage, limited buffer, limited antennas, and so forth. In order for such MTC UE to attach to a base station, the MTC UE would need to first initiate a cell search procedure in order to attach to the cell of the base station. However, the cell search procedure could potentially be challenging for a difficult to reach MTC UE, and the challenge is to be explained in further details.

FIG. 1 serves to illustrate a typical cell search procedure for a wireless communication system. During a cell search procedure, assuming that a MTC UE 102 has awoken from a dormant state and seeks to attach to a closest base station, such as base station 101. In step S101, The UE 102 would be required to read a primary synchronization signal (PSS) and a secondary synchronization signal (SSS) in order to obtain essential information such as information related to a cell identification (ID) of the base station 101 or frame timing information. The cell ID could be the physical cell identifier (PCI) in the case of LTE. As the result of obtaining the PCI, in step S102, the UE 102 would be able to read a cell specific reference signal (CS-RS) to complete the synchronization procedure. After the synchronization procedure, in step S103, the UE 102 would read from a broadcast channel such as a physical broadcast channel (PBCH) for the master information block (MIB), or in step S104, the UE 102 would be able to read from the physical downlink shared channel (PDSCH) for the system information block (SIB).

Information in the PBCH would then undergo a channel coding and modulation process. In particular, 40 bits of MIB may pass through a channel coding process, a rate matching process, and a scrambling process. After the scrambling process, the data would be modulated using QPSK. Subsequently, the rest of processes would involve layer mapping, precoding, resource mapping, and OFDM generation. For the case of LTE, The detailed descriptions of these processes are described in section 6.6 of "Physical Channels and Modulation," 3GPP TS 36.211, V11.2.0, 2013-02 which is incorporated by reference and also section 5.3 of Multiplexing and channel coding," 3GPP TS 36.212, V11.2.0, 2013-02 which is also incorporated by reference.

FIG. 2 illustrates the resource location of a PBCH according to a current standard of the LTE communication system. Typically, system information in the MIB would require at most 4 radio frames 201 or 40 transmission time intervals. In other words, the system information in MIB of a cell would not change for at least 4 radio frames. Each radio frame 203 contains 10 subframes with each subframe 206 having two slots, namely slot 0 and slot 1. The radio resource of a PBCH 202 according to FIG. 2 is allocated in slot 1 of the 0$^{th}$ subframe, and a PBCH 202 is allocated in the central 6 physical resource blocks of transmission frequency band and the first four Orthogonal Frequency Domain Modulation (OFDM) symbols 207 of slot 1 of a subframe 206.

However, if a MTC UE is located in difficult to reach places and is thus unable to discern information from the PBCH broadcasted from a cell, the UE would not able to attach to the cell. Therefore, in order to reach MTC UEs in hard to reach places such as underground without incurring extra costs by inserting additional technologies, existing communication infrastructures may need to improve their coverage by an additional 15~20 decibel (dB) in order to enhance coverage for MTC devices. In order to extend the PBCH coverage, one idea could be to increase repetition of the number of MIB transmissions. FIG. 3 illustrates a crude example of such concept by repeating PBCH transmission multiple times within each radio frame. By repeating an identical PBCH transmission multiple times, the broadcast coverage of a cell could be extended at the expense of a larger amount of system capacity. Therefore, this solution would not be optimal.

SUMMARY OF THE DISCLOSURE

Accordingly, the present disclosure is directed to a method of extending cell coverage, a base station using the same method, and a user equipment using the same method.

In one of the exemplary embodiments, the present disclosure is directed to transmission coverage extension method applicable to a base station, and the method includes at least but not limited to transmitting a system information over a physical channel located at a first physical location in a group of radio frames, determining based on a cell identification (ID) of the base station the second physical location for a repetition of the system information over the physical channel located at the second physical location in a group of radio frames, and transmitting the repetition of the system information at the second physical location in the group of radio frames.

In one of the exemplary embodiments, the present disclosure is directed to a base station that includes at least but not limited to a transmitter for transmitting wireless signal, and a processing circuit that is coupled to the transmitter and is configured at least for transmitting a system information over a physical channel located at a first physical location in a group of radio frames by using the transmitter, determining based on a cell identification (ID) of the base station the second physical location for a repetition of the system information over the physical channel located at the second physical location in a group of radio frames, and transmitting the repetition of the system information at the second physical location in the group of radio frames by using the transmitter.

In one of the exemplary embodiment, the present disclosure is directed to a transmission coverage extension method applicable to a user equipment, and the method includes at least but not limited to receiving a system information over a physical channel located at a first physical location in a group of radio frames, determining based on a cell identification (ID) the second physical location for a repetition of the system information over the physical channel located at the second physical location in a group of radio frames, and receiving the repetition of the system information at the second physical location in the group of radio frames.

In one of the exemplary embodiments, the present disclosure is directed to a user equipment that includes at least but not limited to a receiver for receiving wireless signal and a processing circuit coupled to the receiver and is configured at least for receiving a system information over a physical channel located at a first physical location in a group of radio frames, determining based on a cell identification (ID) the second physical location for a repetition of the system information over the physical channel located at the second physical location in a group of radio frames, and receiving the repetition of the system information at the second physical location in the group of radio frames.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
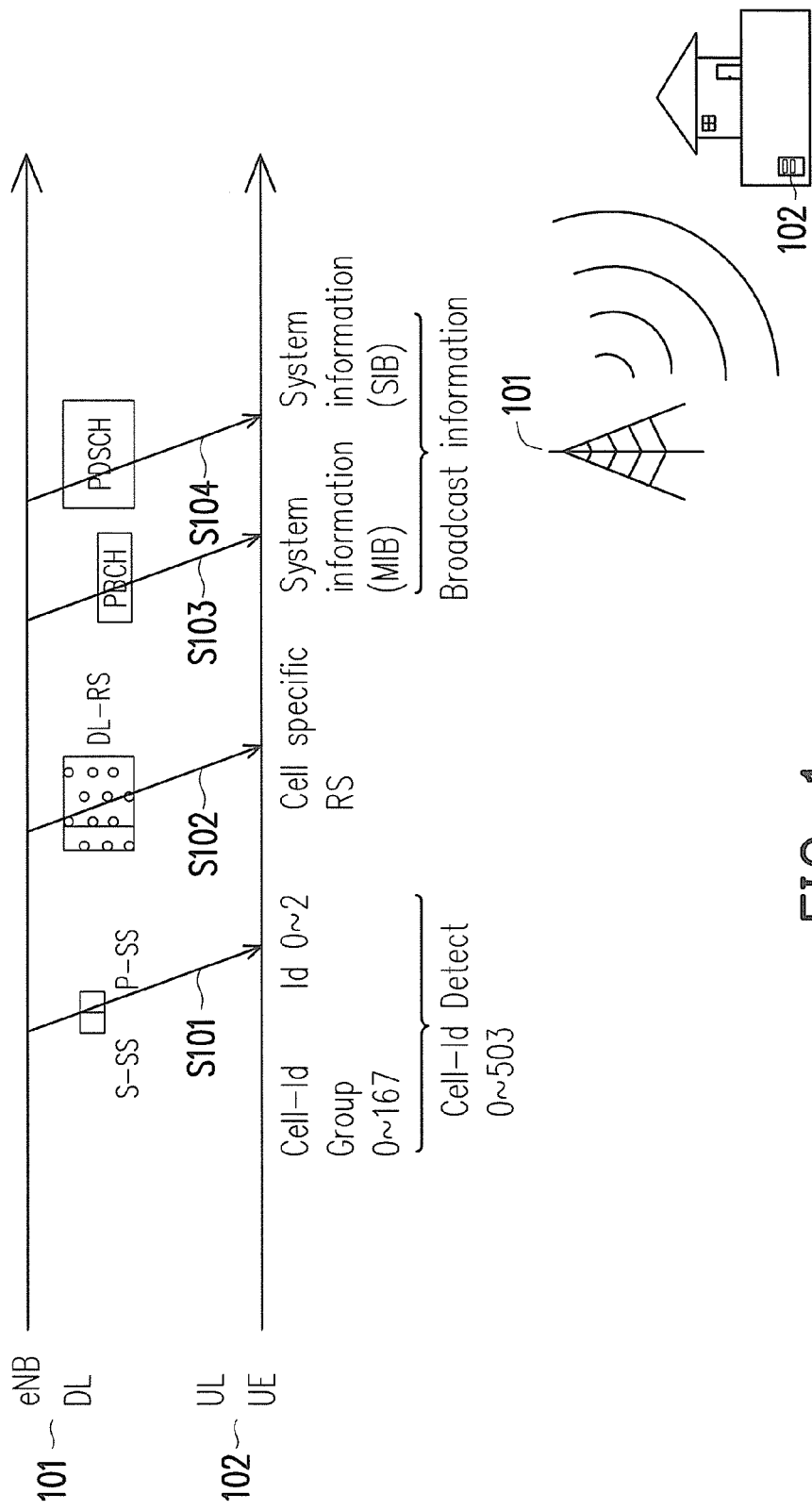
FIG. 1 illustrates a cell search procedure between a UE and a base station according to a standard of a wireless communication system.
Figure 2:
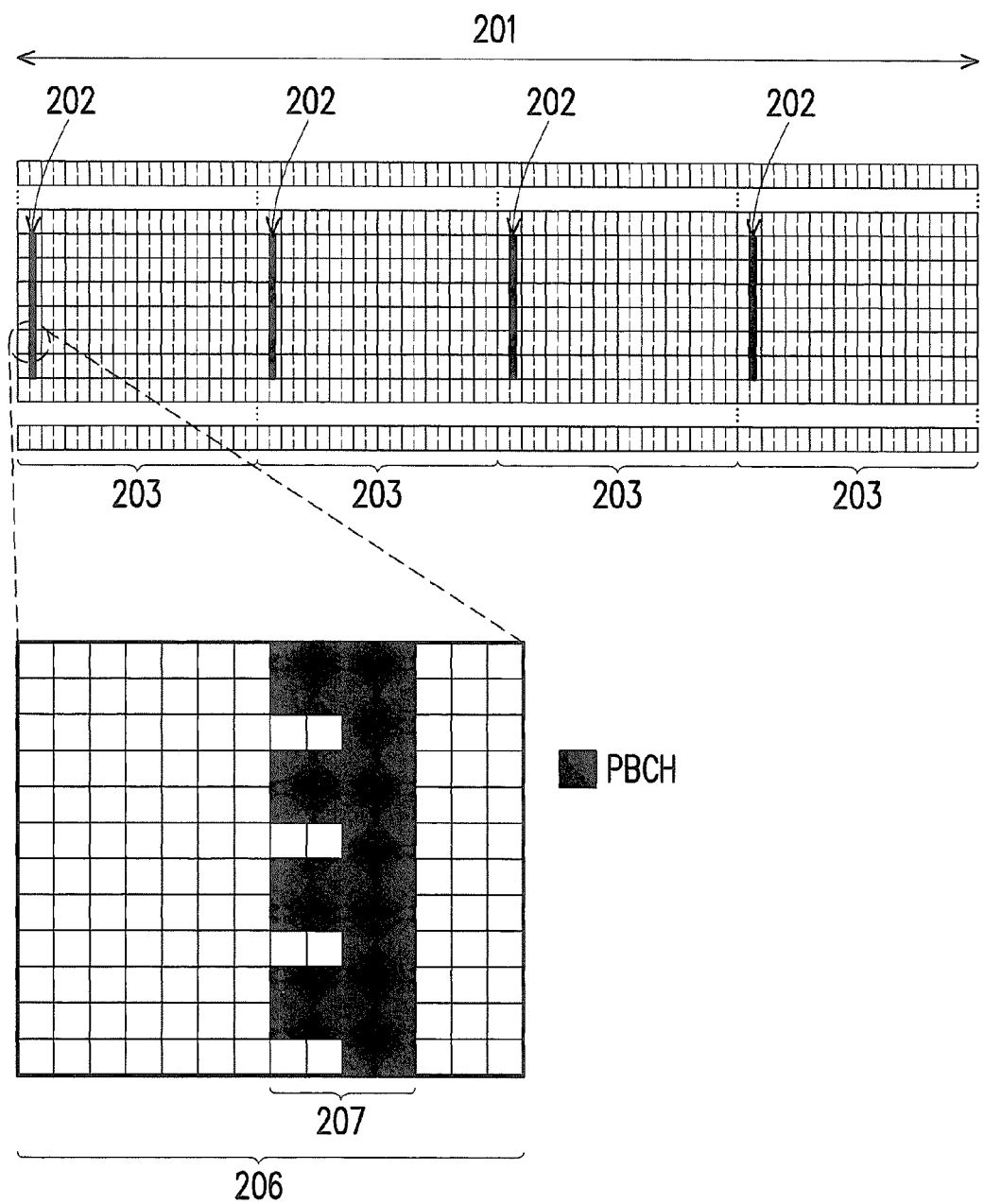
FIG. 2 illustrates the resource location of PBCH according to a standard of a wireless communication system.
Figure 3:
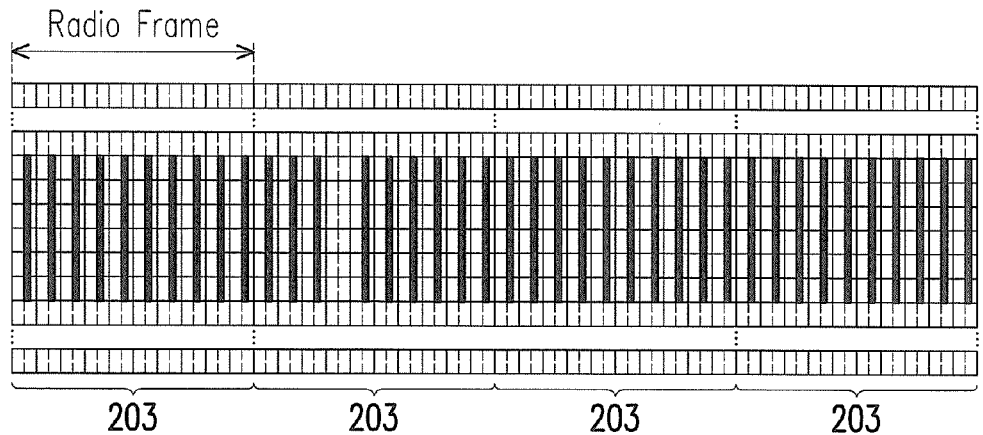
FIG. 3 illustrates repetitions of PBCH in a wireless communication system.

Reference will now be made in detail to the present exemplary embodiments of the disclosure, examples of which are illustrated in the accompanying drawings. Wherever possible, the same reference numbers are used in the drawings and the description to refer to the same or like parts.

As low cost MTC devices are deployed in hard to reach places such as a deep underground location, coverage improvement would be required for these devices or else they will fail to stay connected to a base station. During a cell search procedure, PBCH is the first channel from which a UE would access to acquire essential system information such as system bandwidth, system frame number, physical hybrid-ARQ indicator channel (PHICH) configuration, and so forth. Therefore, PBCH coverage improvement is necessary for MTC devices that need coverage improvement. Repetition of transmissions and power spectrum density (PSD) boosting could be regarded as methods for coverage enhancements. However, since the content of PBCH may change outside the boundary of a 40 ms interval, a repetition of the PBCH should be performed within the 40 ms interval.

It should also be noted that the PBCH are currently placed in the 6 center physical resource block (PRB) pairs. As a result, the spectral efficiency loss with PBCH repetition would be quite high. In order to reduce the spectral efficiency loss by repetition, intermittent transmission could be as a feasible solution. With intermittent transmission, the PBCH repetition burst does not necessarily happen in every subframe but happens with a periodicity. In other words, PBCH repetition burst only happens in certain subframes and there is no PBCH repetition in other subframes. On the other hand, considering the PSD boosting on PBCH repetition, the interference from PBCH repetition could become high. It is desirable to develop a mechanism to handle the interference problem caused by PBCH with PSD boosting. Therefore, the present disclosure proposes utilizing the cell ID (or PCI) of each cell to determine the physical resource location of intermittent transmission of PBCH repetition burst of each cell. In this way, the time-domain inter-cell interference cancellation could be achieved to handle interference problems.

Figure 4:
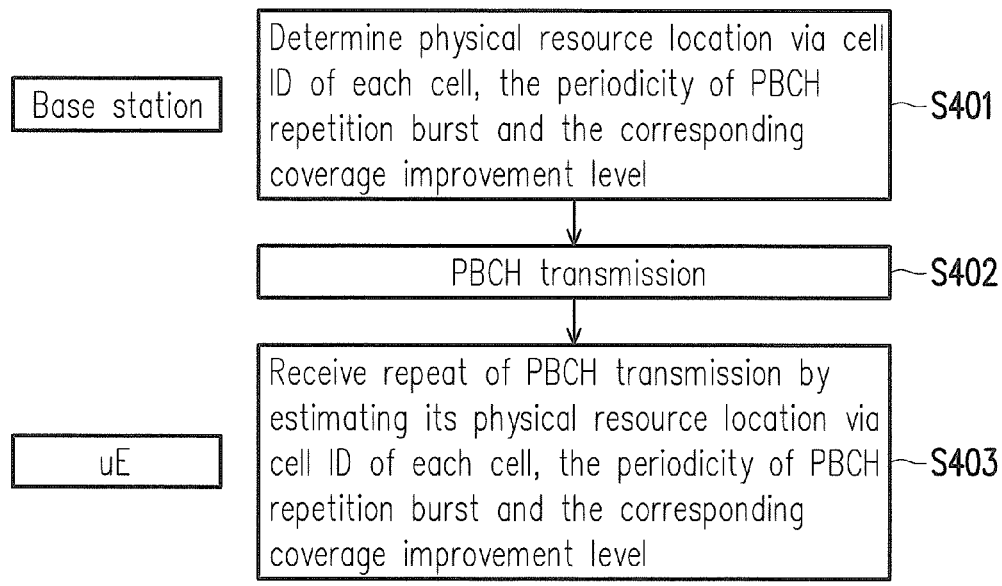
FIG. 4 is a conceptual flow chart that illustrates determining the physical resource location of PBCH repetition burst of each cell.
Figure 5:
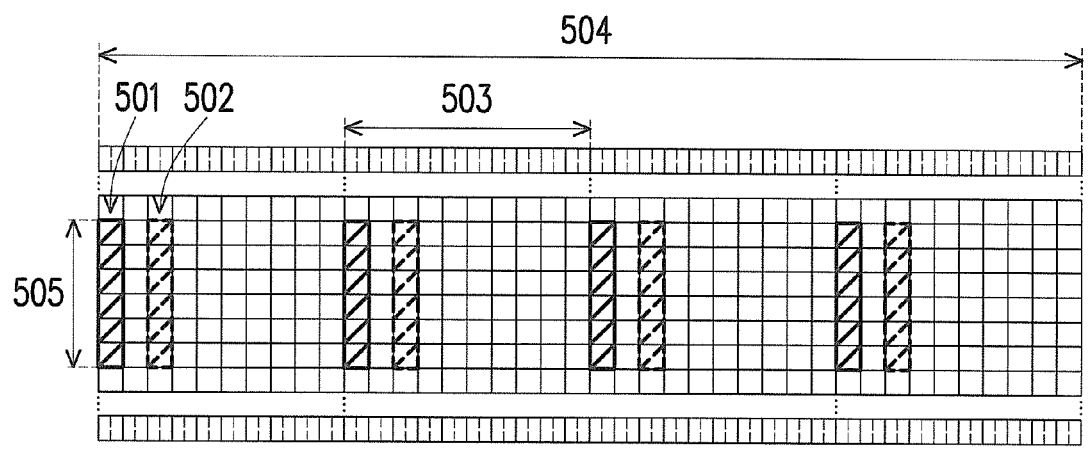
FIG. 5 illustrates repeating PBCH according to the first exemplary embodiment of the present disclosure.
Figure 6:
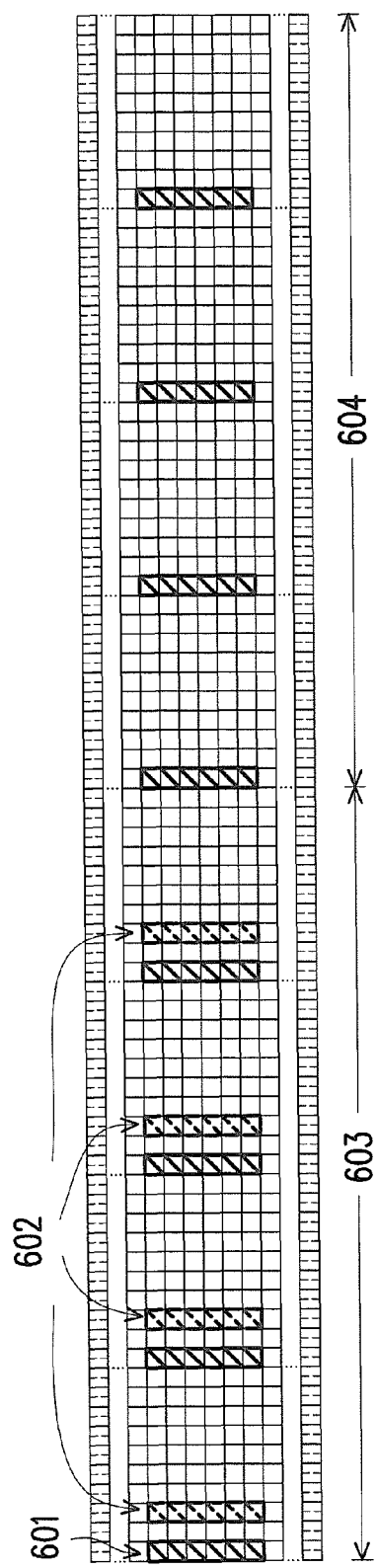
FIG. 6 illustrates repeating PBCH according to the second exemplary embodiment of the present disclosure.
Figure 7:
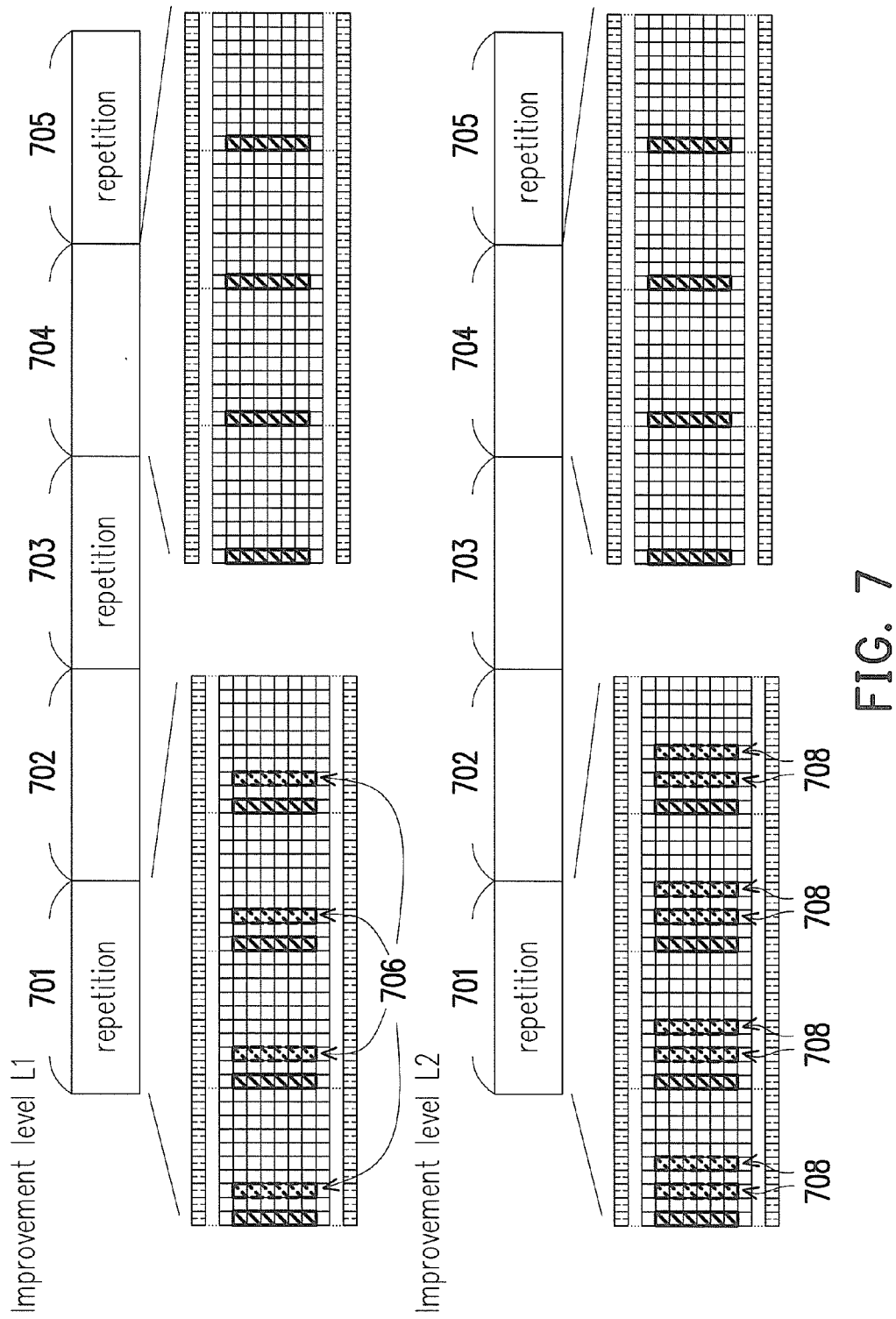
FIG. 7 illustrates repeating PBCH according to the third exemplary embodiment of the present disclosure.

The solution is introduced in FIG. 4 which is a conceptual flow chart that illustrates determining the physical resource location of PBCH repetition burst of each cell. In step S401, a base station would determine the physical location resource location via cell ID of each cell, the periodicity of PBCH repetition burst, and the coverage improvement level. These parameters could be determined, for example, as the result of the current traffic condition. In step S402, the base station would transmit the PBCH via a transmitter. In step S403, the PBCH would be received by a UE, and the UE would also receive a repeat of PBCH transmission by estimating its physical resource location via cell ID, the periodicity of PBCH repetition burst, and the coverage improvement level. FIG. 5~7 will present further details in the form of various exemplary embodiments.

FIG. 5 illustrates repeating PBCH according to a first exemplary embodiment of the present disclosure. Typically, a radio frame 503 would contain 10 subframes numbered subframe 0-9 with each subframe containing two slots, namely slot 0 and slot 1. The legacy PBCH 501 would be transmitted in the slot 1 of subframe 0. The content of system information may change every four radio frames, and thus four radio frames in which system information does not changed is referred to as a radio frames group 504 in this disclosure. For the first exemplary embodiment, the repetition 502 of PBCH would occur in every radio frame.

In particular, the physical resource location of PBCH repetition burst 502 is determined by at least the cell ID of each cell ($N_{ID}^{cell}$). For example, the PBCH repetition burst 502 happens in the center 6 PRB pairs and the first four OFDM symbols of slot 1 of the subframe K+($N_{ID}^{cell}$ mod X) in each radio frame, where X and $N_{ID}^{cell}$ are non-zero integers, and K is an offset number. For example, assuming that K=1 and X=3, then $N_{ID}^{cell}$ mod 3 could only be 0, 1, or 2. Therefore, the PBCH repetition burst 502 would occur in subframe 1, 2, or 3 of each radio frame once.

Similarly, it would be apparent to an ordinary person skilled in the art that the formula "K+($N_{ID}^{cell}$ mod X)" could also be used to determine not only the subframe number but also various parameters such as the slot number, the OFDM symbols position, the PRB pair position, and the subcarrier position of a PBCH repetition burst 502. For example, the slot number of a PBCH repetition burst 502 would be determined by 0+($N_{ID}^{cell}$ mod 2) as there are two slots in each subframe.

Based on the abovementioned principle, a base station would determine what radio resource is used to place PBCH repetitions 502. As for a mobile device, the cell ID of each cell could be derived by receiving primary synchronization signal (PSS) and the secondary synchronization signal (SSS), and the mobile device may then receive PBCH repetitions 502 on the corresponding physical resource based on the abovementioned rule. The advantage of doing such is that interference among cells could be mitigated since neighbor cells tend to have adjacent physical cell ID's (PCI's). If neighboring cells have adjacent PCI's, they are unlikely to transmit PBCH repetitions burst on the same subframe. Therefore, interference problem caused by PBCH repetition with PSD boosting would be reduced.

FIG. 6 illustrates repeating PBCH according to a second exemplary embodiment of the present disclosure. Similar to the first exemplary embodiment, four radio frames are assumed to be in a radio frame group, and a legacy PBCH 601 would be assumed to be transmitted in the slot 1 of subframe 0 of each radio frame. But for this exemplary embodiment, the physical resource location of PBCH repetition burst 602 does not occur in every radio frame (or radio frame group) unlike the first exemplary embodiment. The physical resource location of PBCH repetition burst is determined by at least the combination of cell ID ($N_{ID}^{cell}$) of each cell and the periodicity of PBCH repetition burst. The exemplary scenario of FIG. 6 shows at least two radio frames groups. The first radio frame group 603 contains PBCH repetition burst 602 but the second radio frame 604 frame group does not contain any PBCH repetition burst.

For the embodiment according to FIG. 6, the PBCH repetition burst 602 happens in the center 6 PRB pairs and the first four OFDM symbols of slot 1 of the subframe 1+($N_{ID}^{cell}$ mod X) of a radio frame, where ($N_{ID}^{cell}$) and X are both integers, and the radio frame which the PBCH repetition burst 602 occurs in determined by $$\left\lfloor \frac{N_f}{Z} \right\rfloor \mathrm{mod} N_{periodicity} = Y,$$

where $N_f$ is the system frame number which is an integer, $N_{periodicity}$ is the period of PBCH repetition burst in terms of radio frames, and Z is the group size which is preferably but not limited to 4 or a multiple of 4. Y represents an offset number and could be for example, a zero or $N_{ID}^{cell}$ mod X. Assuming that X=3, and thus a PBCH repetition burst 602 would happen in subframes 1, 2, or 3. Assuming that $N_{periodicity}$ is 2, Z=4 and Y=0, then $N_f$ could be 0, 1, 2, 3, 8, 9, 10, 11, 16, 17, 18, 19, and so forth. A PBCH repetition burst 602 could occur in the above mentioned $N_f$. In other words, for the exemplary scenario in FIG. 6, when $N_f$ is 0, 1, 2, 3 there is PBCH repetition bursts in the first radio frame group 603, but when Nf is, 4, 5, 6, 7, there is no PBCH repetition burst in the second radio frame group 604.

Similar to the first exemplary embodiment, the cell ID ($N_{ID}^{cell}$) could also be used to determine the radio frame, the subframe, the slot, OFDM symbols position, PRB pair position, and subcarrier position of the PBCH repetition 602 burst.

A base station side would determine the physical resource location in which the PBCH repetition burst 602 occur based on the abovementioned principle. As for a mobile device, the cell ID of each cell could be derived by receiving primary synchronization signal (PSS) and secondary synchronization signal (SSS). The reception of PBCH repetition on the correct physical resource could then be determined based on the abovementioned rule. The second exemplary embodiment is suitable for the scenario when the PBCH repetition does not have to occur in every radio frame group and in selected radio frame group according to the current traffic condition.

It should be noted that mobile devices may not derive system frame number, $N_f$, before the accessing PBCH. Therefore, if the physical resource location of PBCH repetition burst is related to system frame number (i.e. the radio frame group location), the mobile devices may blindly decode each 4 of the consecutive radio frames until successfully decoding PBCH repetition burst. On the other hand, once a mobile device has detected a PBCH repetition burst, since the occurred radio frame group of PBCH repetition burst is related to PBCH repetition burst, the system frame number bits in non-legacy PBCH could be reduced since the mobile device may obtain system frame number information via blind detection of the PBCH repetition bursts. At the same time, the base station also may also be able to reduce the PBCH content based on a similar principle.

The present disclosure proposes a third exemplary embodiment of the present disclosure. For this exemplary embodiment, the physical resource location of PBCH repetition burst is determined by at least the combination of cell ID of each cell, the periodicity of PBCH repetition burst and the corresponding coverage improvement level. In general, the PBCH repetition burst with coverage improvement level L1 may happen in the center 6 PRB pairs and the first four OFDM symbols of slot 1 of the subframe 1+($N_{ID}^{cell}$ mod X) in the radio frame where the system frame number $$\left\lfloor \frac{N_f}{Z} \right\rfloor \bmod N_{periodicity} = Y,$$

where X is non-zero integer, $N_{ID}^{cell}$ is an integer, and Y could be zero or $N_{ID}^{cell}$ mod X. Z stands for a group size and is a non-zero integer that is preferable 4 or multiple of 4 but not limited to 4 or multiple of 4.

Referring to FIG. 7 which illustrates an example of two coverage improvement levels, L1 and L2, where L1<L2, and L1 and L2 could be, for example, a power level expressed in decibels. FIG. 7 shows at least 5 radio frame groups 701~705 for coverage improvement level L1 of which the radio frame groups 701, 703, and 705 contain PBCH repetition bursts 706 but not radio frame groups 702 and 704. For coverage improvement L2 of which the radio frame groups 701 and 705 contain PBCH repetition bursts 708 but not radio frame groups 702, 703, 704. In general, there is a greater number of PBCH repetitions within a radio frame group for higher level of coverage improvement, but there would be less radio frame groups containing repetitions since the more radio resources would be needed to transmit user data.

In more specific details, assuming that the in addition to the legacy PBCH, a base has determined station may determine that in order to improve the coverage level by L1 which could be 15 dB for example, additional PBCH repetition burst 706 is required within radio frame groups 701~705 in order to reach the targeted coverage level. For example, assuming Y=0, for coverage improvement level L1, the PBCH repetition burst happens with $N_{periodicity}$ 2, which means PBCH in radio frame $$\left\lfloor \frac{N_f}{4} \right\rfloor \bmod 2 = 0$$

could have at least one repetition. In other words, for radio frames 0, 1, 2, 3, 4, 5, 6, 7, 8, 9, 10, 11, 12, 13, 14, 15, 16, 17, 18, 19, i.e. radio frame groups 0, 1, 2, 3, 4, the PBCH is repeated in radio frames 0, 1, 2, 3, 8, 9, 10, 11, 16, 17, 18, 19, i.e. radio frame group 0, 2, 4 (radio frames 0, 1, 2, 3 form radio frame group 0, radio frames 4, 5, 6, 7 form radio frame group 1 and so on.). In other radio frames (groups) there would only be regular PBCHs. It should be noted that MIB content within each radio frame group would typically be the same but different from other radio frame groups. For the aforementioned coverage improvement level L2 which is larger than L1, since it may require more repetitions within a radio frame group, its $N_{periodicity}$ should be larger than $N_{periodicity}$ of coverage improvement level L1 to avoid occupy too many physical resources. For example, its $N_{periodicity}$ can be 4. In this case, PBCH in radio frame $$\left\lfloor \frac{N_f}{4} \right\rfloor \bmod 4 = 0$$

have repetition. In other words, for radio frame 0, 1, 2, 3, 4, 5, 6, 7, 8, 9, 10, 11, 12, 13, 14, 15, 16, 17, 18, 19, i.e. radio frame group 0, 1, 2, 3, 4, the PBCH has repetitions in radio frame 0, 1, 2, 3, 16, 17, 18, 19, i.e. radio frame group 0, 4. The third exemplary embodiment is suitable for meeting a specific coverage requirement according to the current traffic condition.

Similar to previous exemplary embodiments, Cell ID could also be used to determine the radio frame, the subframe, the slot, OFDM symbols position, PRB pair position, and subcarrier position of the PBCH repetition burst. A base station may allocate physical resource for PBCH repetition by the abovementioned rule. As for a mobile device side, the cell ID of each cell could be derived by receiving primary synchronization signal (PSS) and secondary synchronization signal (SSS). The PBCH repetition could be received based on the allocated physical resource according to the abovementioned rule.

It should be noted that mobile devices may not derive system frame number, $N_f$, before the accessing PBCH. Therefore, if the physical resource location of PBCH repetition burst is related to system frame number (i.e. the radio frame location), the mobile devices may blindly decode each 4 of the consecutive radio frames until successfully decoding PBCH repetition burst. On the other hand, once a mobile device has detected a PBCH repetition burst, since the occurred radio frame of PBCH repetition burst is related to PBCH repetition burst, the system frame number bits in non-legacy PBCH could be reduced since the mobile device may obtain system frame number information via blind detection of the PBCH repetition bursts. At the same time, the base station also may also be able to reduce the PBCH content based on a similar principle.

Figure 8:
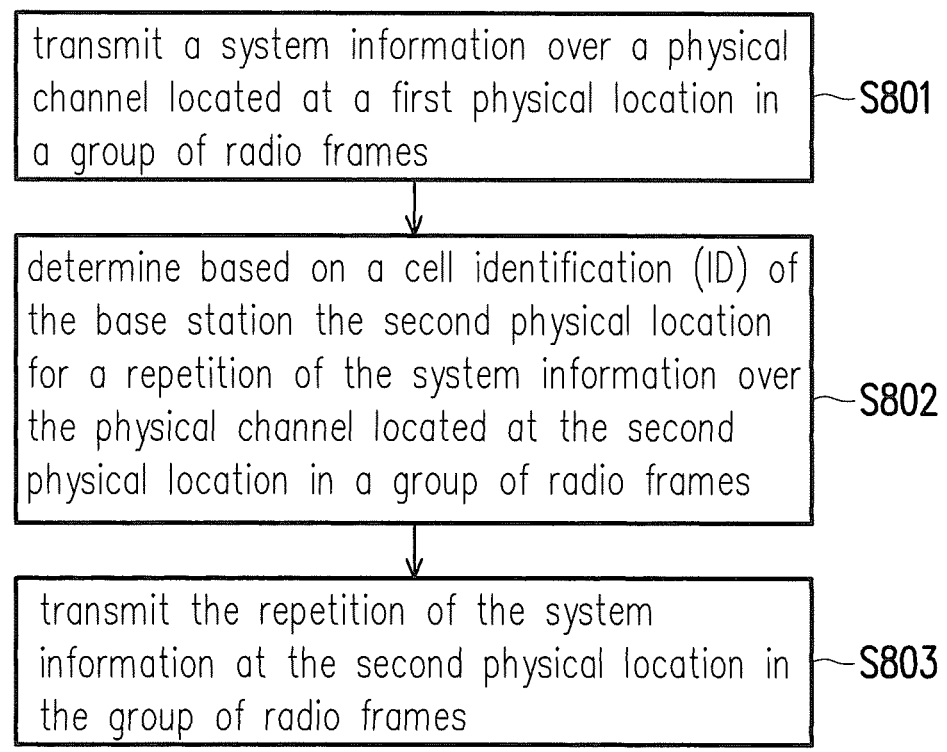
FIG. 8 is a flow chart which illustrates the method of cell coverage extension from the perspective of a base station in accordance with one of the exemplary embodiments of the present disclosure.

FIG. 8 is a flow chart which illustrates the method of cell coverage extension from the perspective of a base station in accordance with one of the exemplary embodiments of the present disclosure. The method includes at least but not limited to S801~S803. In step S801, a base station transmits system information over a physical channel located at a first physical location in a group of radio frames. In step S802, the base station, determines based on a cell identification (ID) of the base station the second physical location for a repetition of the system information over the physical channel located at the second physical location in a group of radio frames. The group of radio frames could be several consecutive radio frames. In step S803, the base station transmits the repetition of the system information at the second physical location in the group of radio frames. The second physical location could also be determined based on the periodicity of PBCH repetition and a coverage improvement level.

Figure 9:
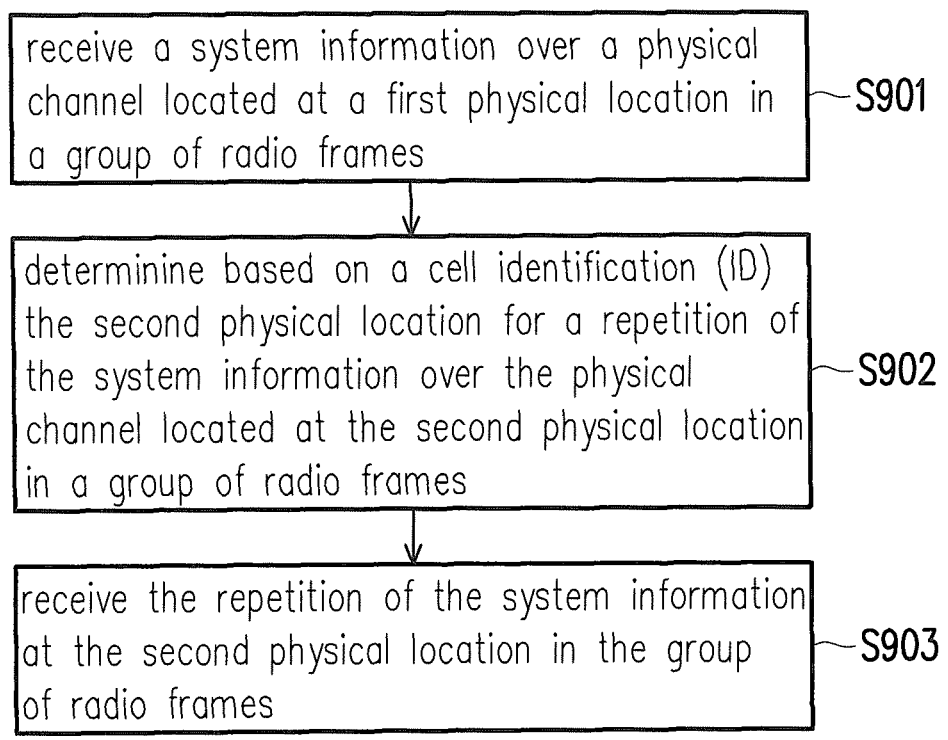
FIG. 9 illustrates the method of cell coverage extension from the perspective of a user equipment in accordance with one of the exemplary embodiments of the present disclosure.

FIG. 9 illustrates the method of cell coverage extension from the perspective of a user equipment in accordance with one of the exemplary embodiments of the present disclosure. The method includes at least but not limited to steps S901~S903. In step S901, the UE receives a system information over a physical channel located at a first physical location in a group of radio frames. In step S902, the UE determines based on a cell identification (ID) the second physical location for a repetition of the system information over the physical channel located at the second physical location in a group of radio frames. In step S903, the UE receives the repetition of the system information at the second physical location in the group of radio frames. The second physical location could also be determined based on the periodicity of PBCH repetition and a coverage improvement level.

Figure 10:
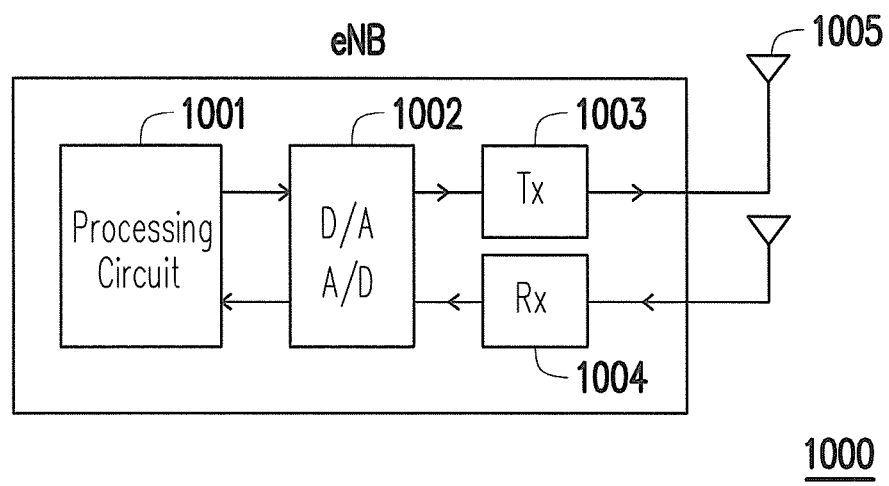
FIG. 10 is a functional block diagram which illustrates an exemplary base station of the present disclosure.

FIG. 10 is a functional block diagram which illustrates an exemplary base station of the present disclosure. The proposed base station would include at least but not limited to a processing circuit 1001 coupled to an analog-to-digital (A/D)/digital-to-analog (D/A) converter 1002, a transmitter 1003, a receiver 1004, and one or more antenna units 1005. The transmitter 1003 and receiver 1004 transmit downlink signals and receives uplink signals wirelessly. The transmitter 1003 and receiver 1004 may also perform operations such as low noise amplifying, impedance matching, frequency mixing, up or down frequency conversion, filtering, amplifying, and so like. The (A/D)/(D/A) converter 1002 is configured to convert from an analog signal format to a digital signal format during uplink signal processing and from a digital signal format to an analog signal format during downlink signal processing.

The processing circuit 1001 is configured to process digital signal and to perform procedures of the proposed method of extending transmission coverage in accordance with the aforementioned exemplary embodiments of the present disclosure. Also, the processing circuit 1001 may optionally be coupled to a non-transitory storage medium to store programming codes, device configurations, a codebook, buffered or permanent data, and so forth. The functions of the processing circuit 1001 could be implemented by using programmable units such as a micro-processor, a micro-controller, a DSP chips, FPGA, etc. The functions of the processing circuit 1001 may also be implemented with separate electronic devices or ICs, and the processing circuit may also be implemented with either hardware or software.

Figure 11:
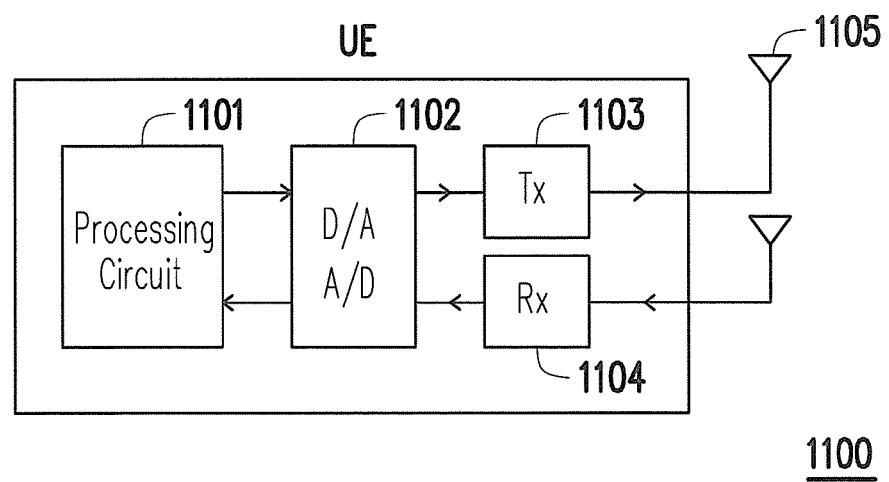
FIG. 11 is a functional block diagram which illustrates an exemplary user equipment of the present disclosure.

FIG. 11 is a functional block diagram which illustrates an exemplary user equipment (UE) of the present disclosure. The UE contains at least but not limited to a processing circuit 1101, coupled to an analog-to-digital (A/D)/digital-to-analog (D/A) converter 1102, a transmitter 1103, a receiver 1104, and one or more antenna units 1105. The functions of these components are similar to those of a base station, and thus a description of these functions will not be repeated.

In this disclosure, 3GPP-like keywords or phrases are used merely as examples to present inventive concepts in accordance with the present disclosure; however, the same concept presented in the disclosure can be applied to any other systems such as IEEE 802.11, IEEE 802.16, WiMAX, and so like by persons of ordinarily skilled in the art.

In this disclosure, the term "base station" (BS) may represent any one of a Home Evolved Node B (HeNB), an eNB, an advanced base station (ABS), a base transceiver system (BTS), an access point, a home base station, a relay station, a scatterer, a repeater, an intermediate node, an intermediary, and/or satellite-based communications base stations.

The term "user equipment" (UE) in this disclosure could represent various embodiments which for example could include but not limited to a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

In view of the aforementioned descriptions, the present disclosure is suitable for being used in a wireless communication system and is able to extend the coverage of a broad channel and at the same time not cause unnecessary interference caused by broad cast signal repetition with PSD boosting.

No element, act, or instruction used in the detailed description of disclosed embodiments of the present application should be construed as absolutely critical or essential to the present disclosure unless explicitly described as such.

Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method of extending transmission coverage applicable to a base station, the method comprising:
   transmitting a system information over a physical channel located at a first physical resource location in a group of radio frames;
   determining based on a cell identification (ID) of the base station a second physical resource location for a repetition of the system information over the physical channel located at the second physical resource location in a group of radio frames; and
   transmitting the repetition of the system information at the second physical resource location in the group of radio frames.

2. The method of claim 1, wherein determining based on the cell ID of the base station the second physical resource location for the repetition of the system information comprising:
   allocating the second physical resource location for the repetition of the system information in a subdivision of a radio frame of the group of consecutive radio frames, wherein each radio frame has multiple subdivisions numbered from zero counting up, and the second physical resource location is located at subdivision number K+(cell ID mod X), wherein X is a non-zero integer and K is a subdivision offset.

3. The method of claim 2, wherein each subdivision is a subframe as the second physical resource location is located at slot 1 of subframe number 1+(cell ID mod X) of the radio frame of the group of consecutive radio frames.

4. The method of claim 2, wherein the subdivision is one of a slot position, an orthogonal frequency division multiplexing (OFDM) symbols position, a physical resource block (PRB) pair position, and a subcarrier position.

5. The method of claim 2, wherein the repetition of the system information occurs at every radio frame of the group of consecutive radio frames.

6. The method of claim 2, wherein determining based on the cell ID of the base station the second physical resource location for the repetition of the system information further comprising:

allocating the second physical resource location for the repetition of the system information in the radio frame that satisfies, wherein Y is an integer, and stands for a periodicity of the repetition of the system information and is an integer, and Z is a non-zero integer and stands for a group size.

7. The method of claim 6, wherein Y=cell ID mod X, wherein X is a non-zero integer.

8. The method of claim 6, wherein determining based on the cell ID of the base station the second physical resource location for the repetition of the system information further comprising:
allocating the second physical resource location for the repetition of the system information so as to reach a coverage improvement level.

9. The method of claim 1 further comprising:
transmitting information of the cell ID over a synchronization signal.

10. A base station comprising:
a transmitter for transmitting wireless signal;
a processing circuit coupled to the transmitter and is configured for:
transmitting a system information over a physical channel located at a first physical resource location in a group of radio frames by using the transmitter;
determining based on a cell identification (ID) of the base station a second physical resource location for a repetition of the system information over the physical channel located at the second physical resource location in a group of radio frames; and
transmitting the repetition of the system information at the second physical resource location in the group of radio frames by using the transmitter.

11. A method of extending transmission coverage applicable to a user equipment, the method comprising:
receiving a system information over a physical channel located at a first physical resource location in a group of radio frames;
determining based on a cell identification (ID) a second physical resource location for a repetition of the system information over the physical channel located at the second physical resource location in a group of radio frames; and
receiving the repetition of the system information at the second physical resource location in the group of radio frames in the cell.

12. The method of claim 11, wherein determining based on the cell ID of the base station the second physical resource location for the repetition of the system information comprising:
determining the second physical resource location for the repetition of the system information to be in a subdivision of a radio frame of the group of consecutive radio frames, wherein each radio frame has multiple subdivisions numbered from zero counting up, and the second physical resource location is located at subdivision number k+(cell ID mod X), wherein K is an integer and stands for a subdivision offset, X is a non-zero integer.

13. The method of claim 12, wherein each subdivision is a subframe as the second physical location is located at slot 1 of subframe number 1+(cell ID mod X) of the radio frame of the group of consecutive radio frames.

14. The method of claim 12, wherein the subdivision is one of a slot position, an orthogonal frequency division multiplexing (OFDM) symbols position, a physical resource block (PRB) pair position, and a subcarrier position.

15. The method of claim 12, wherein the repetition of the system information occurs at every radio frame of the group of consecutive radio frames.

16. The method of claim 12, wherein determining based on the cell ID of the second physical resource location for the repetition of the system information further comprising:
determining the second physical resource location for the repetition of the system information to be in the radio frame that satisfies, wherein Y is an integer, Z is a non-zero integer and stands for a group size, and stands for a periodicity of the repetition of the system information and is an integer.

17. The method of claim 16, wherein Y=cell ID mod X, wherein X is a non-zero integer.

18. The method of claim 11 further comprising:
receiving information of the cell ID over a synchronization signal.

19. The method of claim 12, wherein X=3.

20. A user equipment comprising:
a receiver for receiving wireless signal;
a processing circuit coupled to the receiver and is configured for:
receiving a system information over a physical channel located at a first physical resource location in a group of radio frames;
determining based on a cell identification (ID) a second physical resource location for a repetition of the system information over the physical channel located at the second physical resource location in a group of radio frames; and
receiving the repetition of the system information at the second physical resource location in the group of radio frames.

* * * * *